United States Patent
Colclough et al.

(10) Patent No.: US 8,170,968 B2
(45) Date of Patent: May 1, 2012

(54) RECURSIVE STRUCTURE FOR DIAGNOSTIC MODEL

(75) Inventors: John C. Colclough, Albuquerque, NM (US); Timothy J. Felke, Glendale, AZ (US); George D. Hadden, Plymouth, MN (US); David M. Kolbet, Glendale, AZ (US); Randy Magnuson, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 922 days.

(21) Appl. No.: 12/192,700

(22) Filed: Aug. 15, 2008

(65) Prior Publication Data
US 2010/0042872 A1    Feb. 18, 2010

(51) Int. Cl.
*G06F 17/00* (2006.01)
*G06N 5/00* (2006.01)

(52) U.S. Cl. ............................................. 706/45
(58) Field of Classification Search ............... 706/45
See application file for complete search history.

(56) References Cited

U.S. PATENT DOCUMENTS

| | | | |
|---|---|---|---|
| 5,019,961 A | 5/1991 | Addesso et al. | |
| 5,109,380 A | 4/1992 | Ogino | |
| 5,808,903 A | 9/1998 | Schiltz et al. | |
| 6,208,955 B1 | 3/2001 | Provan et al. | |
| 6,397,221 B1 | 5/2002 | Greef et al. | |
| 6,438,535 B1 | 8/2002 | Benjamin et al. | |
| 6,546,350 B1 | 4/2003 | Hartmann et al. | |
| 6,574,537 B2 | 6/2003 | Kipersztok et al. | |
| 6,738,783 B2 | 5/2004 | Melli et al. | |
| 6,785,667 B2 | 8/2004 | Orbanes et al. | |
| 6,813,587 B2 | 11/2004 | McIntyre et al. | |
| 6,829,527 B2 | 12/2004 | Felke et al. | |
| 6,975,909 B2 | 12/2005 | Kluge et al. | |
| 7,062,493 B1 | 6/2006 | Babka et al. | |
| 7,206,771 B2 | 4/2007 | Alvarez et al. | |
| 7,216,052 B2 | 5/2007 | Fountain et al. | |
| 2003/0093412 A1 | 5/2003 | Urkumyan | |
| 2004/0006566 A1 | 1/2004 | Taylor et al. | |
| 2004/0139079 A1 | 7/2004 | Eryurek et al. | |
| 2004/0176887 A1* | 9/2004 | Kent et al. | 701/30 |
| 2005/0004780 A1 | 1/2005 | Lin et al. | |
| 2005/0015380 A1 | 1/2005 | Burkhardt et al. | |
| 2005/0080593 A1 | 4/2005 | Blaser et al. | |
| 2006/0074938 A1 | 4/2006 | Miller | |
| 2006/0235707 A1* | 10/2006 | Goldstein et al. | 705/1 |
| 2007/0094219 A1* | 4/2007 | Kipersztok | 706/52 |

(Continued)

OTHER PUBLICATIONS

EP Communication, EP 09162528.5 dated Dec. 4, 2011.

(Continued)

*Primary Examiner* — Jeffrey A Gaffin
*Assistant Examiner* — Ababacar Seck
(74) *Attorney, Agent, or Firm* — Ingrassia Fisher & Lorenz, P.C.

(57) ABSTRACT

A recursive mapping structure for diagnostic models is provided. A parent diagnostic model includes a first input module, a first output module, a first monitor module coupled to the first input and first output modules, and a first propagation module coupled between the first input and first output modules. A child diagnostic model includes a second input module, a second output module, a second monitor module coupled to the second input and second output modules, and a second propagation module coupled between the second input and second output modules, wherein the second monitor module is coupled to the first monitor module.

20 Claims, 5 Drawing Sheets

U.S. PATENT DOCUMENTS

2007/0294278 A1   12/2007   Vandermolen et al.
2008/0059120 A1   3/2008    Xiao et al.

OTHER PUBLICATIONS

Kalgren, et al. "Automated Data Translation for Avionics Health Management through Intelligent Evidence Streams and Databases," American Helicopter Society 60th Annual Forum, Online Jun. 7, 2004. pp. 1-10. Baltimore, MD. URL: http://www.impact-tek.com/Resources/TechnicalPublicationPDFs/Aerospace/Impact_AAV_AutomatedDataTranslationForAvionics_AHSFormum60.pdf.

Partial European Search Report for 09162528.5-1225 mailed Oct. 28, 2009.

* cited by examiner

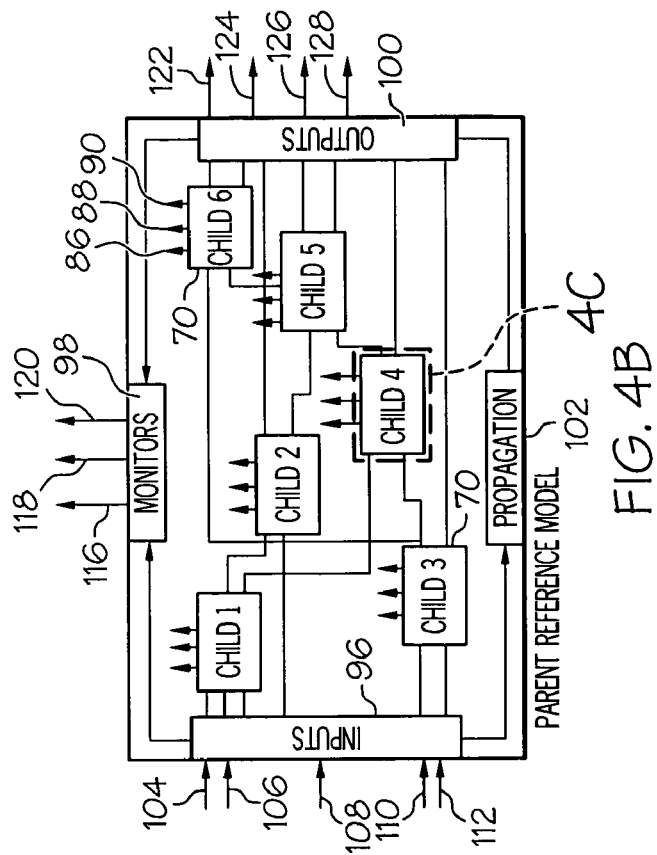
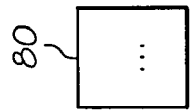
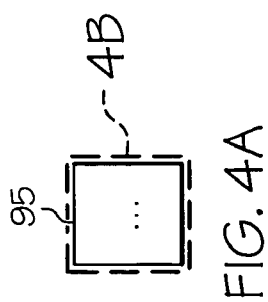
FIG. 4A
FIG. 4B
FIG. 4C
FIG. 4D

RECURSIVE STRUCTURE FOR DIAGNOSTIC MODEL

STATEMENT REGARDING FEDERALLY SPONSORED RESEARCH OR DEVELOPMENT

This invention was made with Government support under Honeywell Project Number AZ19888 (PS-MRS) entitled "Future Combat Systems-Platform Soldier Mission Readiness System," and awarded by the U.S. Department of Defense under Prime Contract Number W56 HZV-05-C-0724, and Subcontract Number 3EC1893 and 5EC8407. The Government has certain rights in this invention.

FIELD OF THE INVENTION

The present invention generally relates to automated reasoning and decision support systems, and more particularly but not exclusively, to a recursive structure for diagnostic models.

BACKGROUND OF THE INVENTION

The study of prognostics refers to an engineering discipline focused on predicting the future condition of a component and/or a system of components. The science of prognostics is based on the analysis of failure modes, detection of early signs of wear and aging in complex systems and components, and correlation of these signs with an aging profile, or model. Diagnostics is a related discipline involving the diagnosis and isolation of a problem by identifying or determining the nature and circumstances of an existing condition of the complex system.

Potential uses for prognostics and diagnostics include estimation of remaining useful life (RUL) and condition-based maintenance. The discipline that links studies of failure mechanisms to system lifecycle management is often referred to as prognostics and health management (PHM). Technical approaches to prognostics can be categorized broadly into data-driven approaches, model-based approaches, and hybrid approaches.

Model-based prognostics and diagnostics attempt to incorporate physical understanding (physical models) of the system into the estimation of remaining useful life and the isolation of existing faults. Modeling physics can be accomplished at different levels, for example, micro and macro levels. At the micro (material) level, physical models may be embodied by series of dynamic equations that define relationships, at a given time or load cycle, between damage (or degradation) of a system component and environmental conditions under which the system/component are operated.

Macro-level models are the mathematical model at system level, which defines the relationship among system input variables, system state variables, and system measures variables/outputs where the model is often a somewhat simplified representation of the system, for example a lumped parameter model. The trade-off is increased coverage with possibly reducing accuracy of a particular degradation mode. Where this trade-off is permissible, faster prototyping may be the result. However, where systems are complex (e.g., a gas turbine engine), even a macro-level model may be a rather time-consuming and labor-intensive process. As a result, macro-level models not be available in detail for all subsystems.

It is desirable to collect data from various subsystems and subassemblies of a complex system, and then integrate the data into a data management system. In order to support this type of integration, the input format must be able to represent the diagnostic data for any level in the system's hierarchy (e.g., platform, sub-platform, system, subsystem, line-replaceable unit (LRU), circuit assembly, integrated circuit (IC), etc.). Accordingly, a need exists for a mechanism to facilitate such integration. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Complex systems often employ an automated reasoning and decision support system to provide an estimate of the current and future health of the system and to assist the operators in correcting any problems that are detected. These systems often rely on a complex knowledge base that guides their interaction with the other portions of the system and supports their diagnostic and prognostic inference mechanisms. Development and maintenance of this knowledge base for a complex system is a very costly and time consuming activity that requires very specialized skills which can fail to produce a useable result if not organized correctly. The present invention provides a mechanism by which the complexity, total effort and total schedule of this effort are reduced by specifying a recursive knowledge base structure that allows the larger problem to be efficiently decomposed to reflect the hierarchical structure of the subsystems and elements of the system.

Accordingly, in one embodiment, by way of example only, a recursive mapping structure for diagnostic models is provided. A parent diagnostic model includes a first input module, a first output module, a first monitor module coupled to the first input and first output modules, and a first propagation module coupled between the first input and first output modules. A child diagnostic model includes a second input module, a second output module, a second monitor module coupled to the second input and second output modules, and a second propagation module coupled between the second input and second output modules, wherein the second monitor module is coupled to the first monitor module.

In another embodiment, again by way of example only, a reference diagnostic model having a recursive mapping structure is provided. The diagnostic model is interpreted by at least one diagnostic reasoner. The diagnostic model includes an input module, an output module, a propagation module in communication with the input and output modules, the propagation module adapted to describe at least one corrective action, and a monitor module in communication with the input and output modules. The input and output module are adapted for communication with an additional reference model on a single level of a hierarchy.

In still another embodiment, again by way of example only, a computer program product for implementing a recursive mapping structure for a diagnostic model interpreted by at least one diagnostic reasoner is provided. The computer program product comprises a computer-readable storage medium having computer-readable program code portions stored therein. The computer-readable program code portions include a first data file portion implementing a parent diagnostic model including a first input module, a first output module, a first monitor module coupled to the first input and first output modules, and a first propagation module coupled between the first input and first output modules. A second data file portion implements a child diagnostic model including a second input module, a second output module, a second monitor module coupled to the second input and second output modules, and a second propagation module coupled between the second input and second output modules. The second monitor module is coupled to the first monitor module.

BRIEF DESCRIPTION OF THE DRAWINGS

The present invention will hereinafter be described in conjunction with the following drawing figures, wherein like numerals denote like elements.

FIGS. 4A-4D illustrate an additional exemplary consolidated reference model using generic terminology.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The present description and following claimed subject matter present exemplary system, and computer program product embodiments of a mechanism to implement diagnostic models having a recursive mapping structure. The recursive mapping structure allows for a number of individual diagnostic model elements to be integrated into a consolidated reference model. The consolidated reference model may be interpreted by one or more diagnostic reasoners (interpretive modules). The consolidated reference model may be constructed from lower level models provided by line-replaceable unit (LRU) suppliers, system integrators, and platform integrators. The consolidated reference model provides all the information specific to a complex system or platform (such as an aircraft). In this way, diagnostic, prognostic, and availability calculations may be facilitated. In addition, maintenance support is provided.

The exemplary embodiments described below illustrate a recursive form for the input format for diagnostic models. In this way, a given diagnostic model may contain other models. Further, these models may be consolidated into another diagnostic model, and so forth of a hierarchy. At each level in the hierarchy, the interconnections between "parents" and "children" (e.g., parent diagnostic models and child diagnostic models as will be further illustrated) have the same syntax and semantics. In this way, the mapping structures between levels of the hierarchy are structurally equivalent. For implementations that use a database to collect model information, the recursive mapping structures described below may be incorporated into a database schema.

Figure 1:
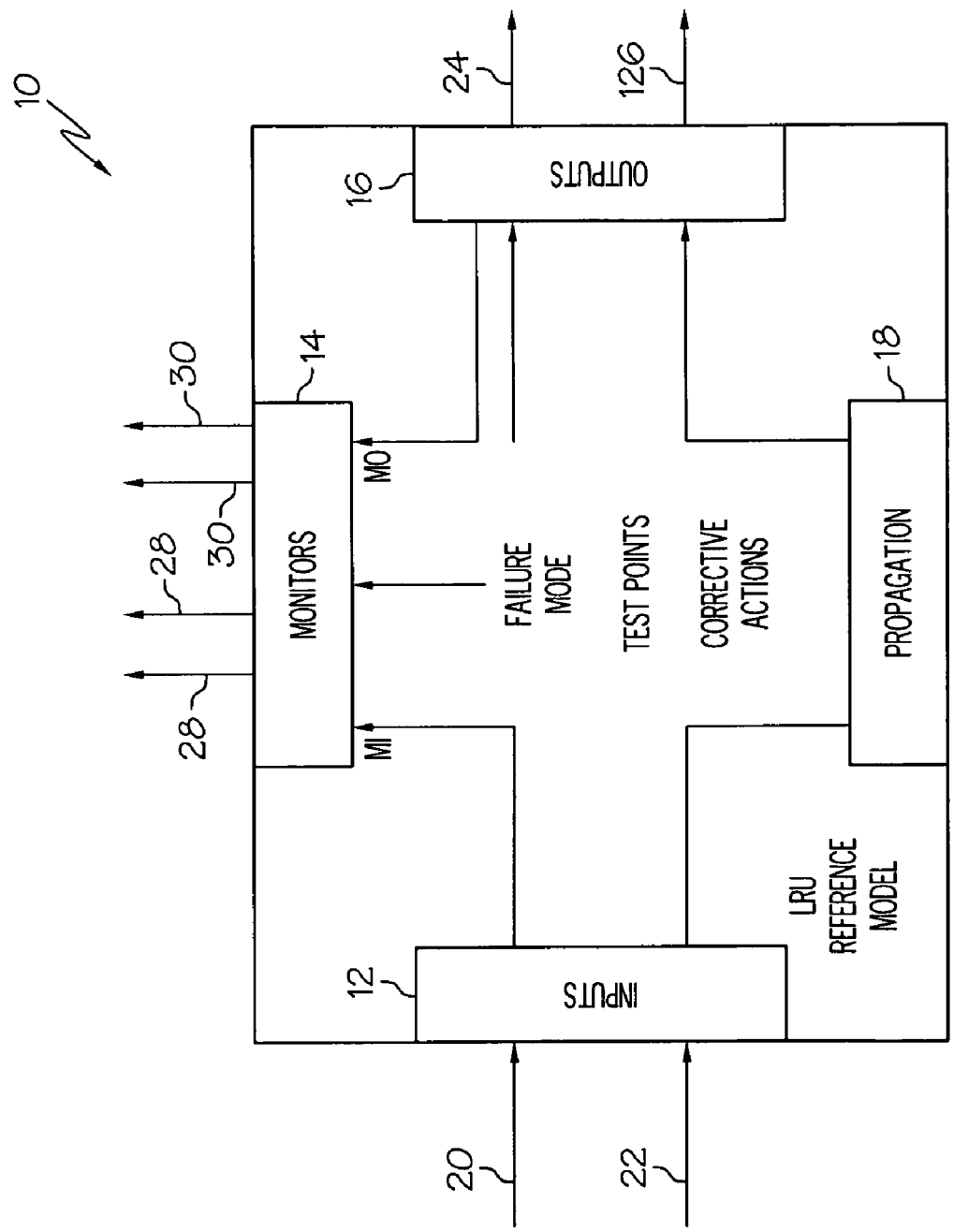
FIG. 1 illustrates an exemplary line-replaceable unit (LRU) reference model.

FIG. 1 illustrates an exemplary reference model 10 used as a basic building block for the consolidated reference model described above. While the model 10 is provided for a line-replaceable unit (LRU), the skilled artisan will appreciate that model 10 may be provided for lower-level systems, sub-systems, components, subcomponents and the like. For example, model 10 may be provided for a circuit assembly on a lower level in a particular hierarchy, or for an integrated circuit (IC) on a still lower level of the hierarchy.

In the depicted embodiment illustrating an exemplary LRU model, each LRU reference model may be adapted to describe the following: (1) failure modes, (2) test descriptions, (3) corrective actions, (4) monitors (including diagnostic, prognostic, parametric and consumption), (4) preventative actions addressing precursor conditions, (5) input signals, output signals, and input signal to output signal mappings, (6) LRU functions, (7) functional availability computations, (8) failure mode to functional effect mappings, and (9) data recording specifications.

Model 10 includes inputs module 12, monitors module 14, outputs module 16, and propagation module 18. Inputs module 12 receives input signals (logical or otherwise) through inputs 20 and 22. The inputs are mapped (logically coupled) to either the monitor module 14 as a monitor input (MI), or the propagation module 18 to assist in propagation modeling/mapping. Outputs module 16 is shown having an output mapped to monitors module 14, as well as outputs 24 and 26. Outputs 24 and 26 are adapted for communication (again, logically or otherwise) with an additional LRU reference model 10 through inputs 20 and 22 as will be further described.

Monitors module 14 includes monitor vectors 28 and 30. Monitor vectors 28 and 30 may be adapted for communication between monitors modules in a higher, and lower, level of a particular hierarchy. For example, monitor vectors 28 may be configured as monitor inputs (MI) from a monitors module 14 of a lower level in the hierarchy. Monitor vectors 30 may be configured as monitor outputs (MO) to a monitors module 14 of a higher level in the hierarchy. In this way, monitors module 14 forms a backbone of communication between levels of the hierarchy.

The structure of model 10 includes elements that are used to describe the internal workings of the entity and elements that are used to identify and configure any subordinate entities used by this entity. Examples of internal elements are failure modes, test points, corrective actions, subordinate entity installation data, input signal definitions, output signal definitions and propagation mappings. In each case, the data that is collected for the entity at this level of the model is recorded in a structure that completely disregards the interface of the entity to its next higher assembly.

Examples of subordinate entity specifications and configuration data include the locations for these entities, their part numbers (or other unique identifier), mapping tables that link monitors reported by subordinate entities to monitors reported at this level, and mapping tables that establish connections between signals defined at this level of the model and the inputs and output signals of the subordinate entities. In the case of subordinate entity specifications, the data collected at this level of the model only needs to link to the monitors, input and output signals of the subordinate entity and disregards any other description of what occurs inside the subordinate entities.

Figure 2:
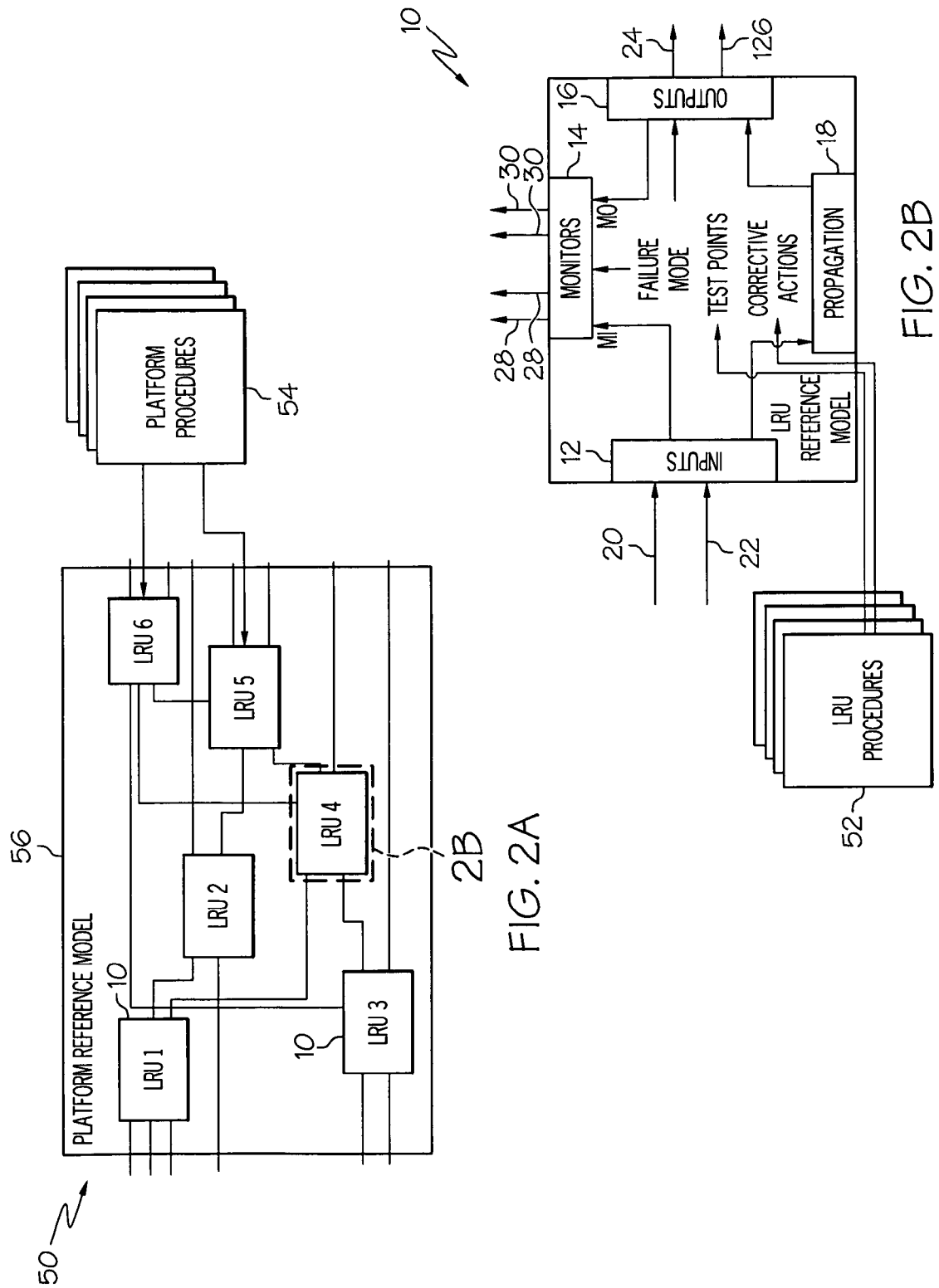
FIG. 2A illustrates an exemplary portion of a consolidated reference model including a platform reference model.
FIG. 2B illustrates an additional exemplary portion of the consolidated reference model including a LRU reference model.

Turning to FIGS. 2A and 2B, an exemplary portion 50 of a consolidated reference model is shown, incorporating a number of LRU reference models 10 as shown. Here, as in FIG. 1, previously, LRU models 10 include recursive mapping structures allowing for communication with additional LRU models 10 or with the platform reference model 56. Platform reference model 56 consolidates each LRU model 10 (including LRU connectivity information and platform-level data). For purposes of illustration, a number of LRU procedures 52 (one for each LRU in the platform) are described by the LRU models 10. These include the test points and corrective action functionality previously described.

In similar fashion to the relationship between LRU procedures 52 and each LRU model 10, the platform reference model 56 incorporates a number of platform-specific procedures 54 relative to the particular platform. As may be seen, inputs 20 and 22 of a particular LRU model 10 may be coupled to the outputs 24 and 26 of an additional LRU model 10. This allows for a number of LRU models 10 to be interconnected across a single layer of the hierarchy, yet maintain communication up or down levels to additional reference models.

In the depicted embodiment illustrating an exemplary platform model, each platform reference model may be adapted to describe the following: (1) a platform description, including a platform type, name, part number, and the like, (2) a platform input and output signal information, (3) interconnect data between the LRU reference models 10 (i.e., the signal relationship between interconnected components), (4) failure cascade information identifying a condition where a fault in a first LRU causes cascaded symptoms to appear in another, downstream LRU, (5) diagnostic monitors to inhibit mapping, identifying diagnostic monitors related to an inhibit condition, (6) inhibit to operational condition mapping, inhibiting failure reporting under operational conditions, (7) promotion of model subelements, defining an input boundary to a defined system of LRUs, and (8) information relating to a physical location of various LRUs within the platform.

Figure 3:
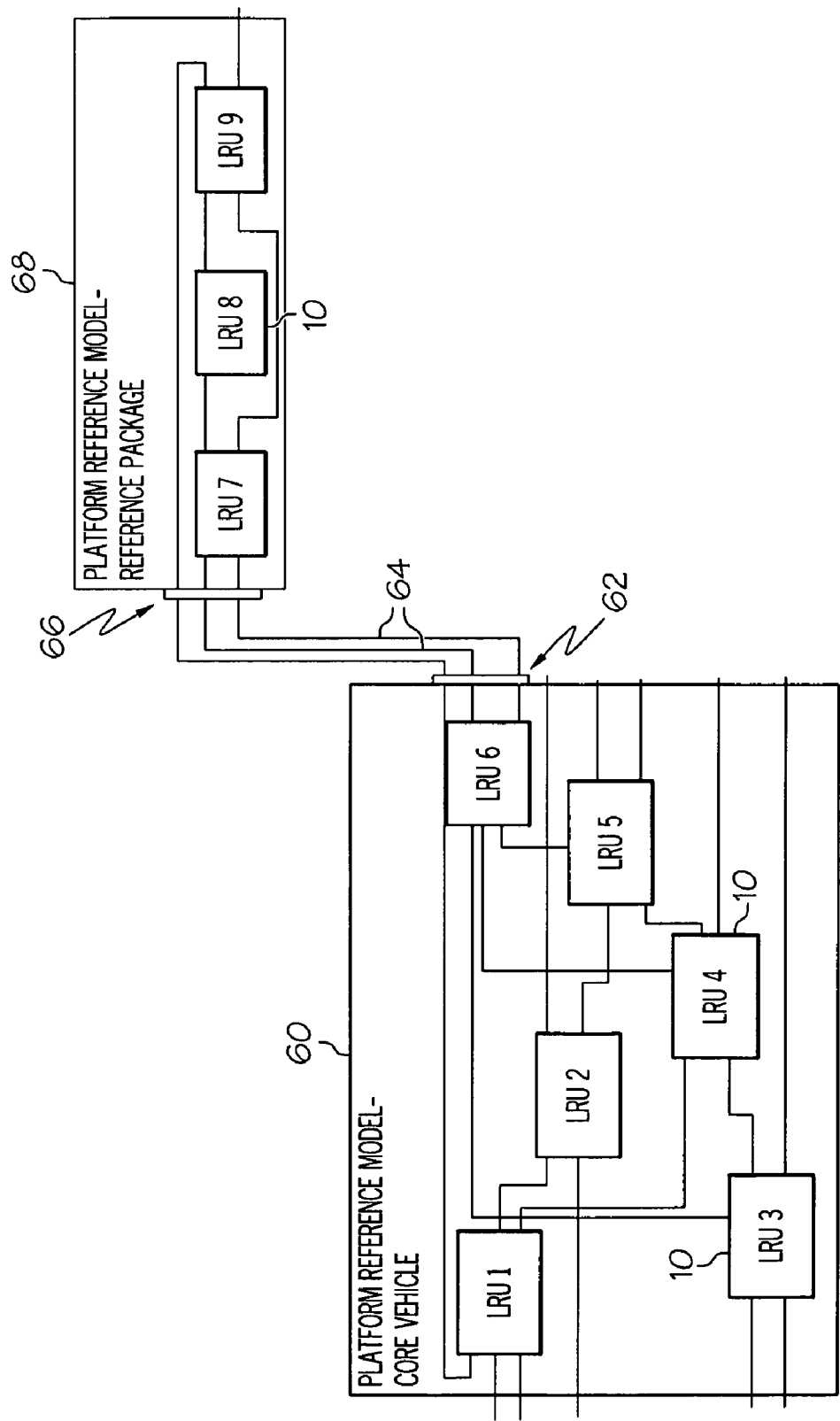
FIG. 3 illustrates two exemplary integrated platform reference models.

The recursive mapping structures of models 10 allow for upper-level models incorporating the models 10 to be themselves interconnected. FIG. 3 illustrates two exemplary interconnected platform reference models. A first platform reference model 60 of a core vehicle (such as a tank) is shown. In addition to a vehicle modeled by a platform reference model, other platforms, such as a power plant, mission package, sensor package, and the like may be similarly modeled.

Core vehicle reference model 60 includes outputs 62 which are connected (via connections 64 (again, logical or otherwise) to the inputs 66 of weapons package platform reference model 68. Again, each platform reference model 60 and 60 include a number of individual LRU reference models 10 that have been interconnected as shown.

FIGS. 4A-4D illustrate an additional exemplary consolidated reference model using generic terminology. The depicted consolidated reference model incorporates a child reference model 70 into a parent reference model 95. In addition, a grandparent reference model 130 incorporates the parent reference model 95, the child reference model 70, and a grandchild reference model 80.

Child reference model 70 includes the same recursive mapping structures described previously, including inputs module 72, monitors module 74, outputs module 76, and propagation module 78 and mapped together similarly as before. Child reference model 70 incorporates a number of grandchild reference models 80 that are mapped together as shown. The monitor outputs of each grandchild reference model 80 are coupled to the monitors module 74 vector 86 (monitor input, MI). Here again, each child reference model 70 includes inputs 82 and 84 which may be mapped to another child reference model 70 on the same level in the hierarchy, and outputs 92 and 94 which may be mapped to the inputs of another child reference model 70 on the same level in the hierarchy.

Parent reference model 95 includes inputs module 96, monitors module 98, outputs module 100, and propagation module 102, with mapped inputs 104, 106, 108, 110, and 112 adapted to communicate with other parent reference models 95 or receive input signals from other logical entities or components on the same hierarchical level. Similarly, outputs module 100 includes outputs 122, 124, 126, and 128, each adapted to communicate with other parent reference models 95 or other parent reference models at the same level of the hierarchy.

To continue the vertical integration between hierarchical levels, the monitors module 74 is coupled to the monitors module 98. The monitor vector 88 is coupled to the monitor vector 116 of the monitors module 98. The monitors module 98 is coupled to an additional monitors module (not shown) integrated into the grandparent model 130 through the monitor vector 118. Monitors modules 74 and 98 include an additional monitor vector 90 and 120) as shown.

At each level of the consolidated model, the monitor vectors provide a structure to report the values for all monitors produced at this level of the model and of the positionalized versions of all monitors reported by subordinate entities. It is important to recognize that the monitors received from lower level entities must be positionalized to indicate the installation location of the entity that reported the monitor. Without this information the system would not be able to discern between monitors reported by the same type of entity that is installed in multiple locations. For example, it is critical to know the location of a smoke detector in order to respond appropriately. The positionalization data is provided by the mapping for monitors, input signals and output signals between layers of the model and is always included in the model for the parent entity.

The recursive structure of grandparent, parent, child, and grandchild diagnostic models allow each reference model to be incorporated into any level of the hierarchy. In addition, the recursive structure allows for an arbitrary depth, and allows for variations of reference models to be constructed by making new reference models out of lower level elements which may change over time.

For example, a model for an engine could be shared among the several different models for platforms that use that engine. Another example is an electric motor that is used in many different locations within an oil refinery. This approach also allows a model to be shared across customers, programs or applications. An example of this would be a model for an electronic valve that is sold to many customers, where each customer has different systems. The model for the valve need only be developed once and then used in the models for all of the other systems. This structure also allows the valve model to be updated at a later time without usually requiring a change to the higher level entities. The only time the higher level entities would need to change is if monitors, input signals or output signals are being added, removed or modified.

Figure 5:
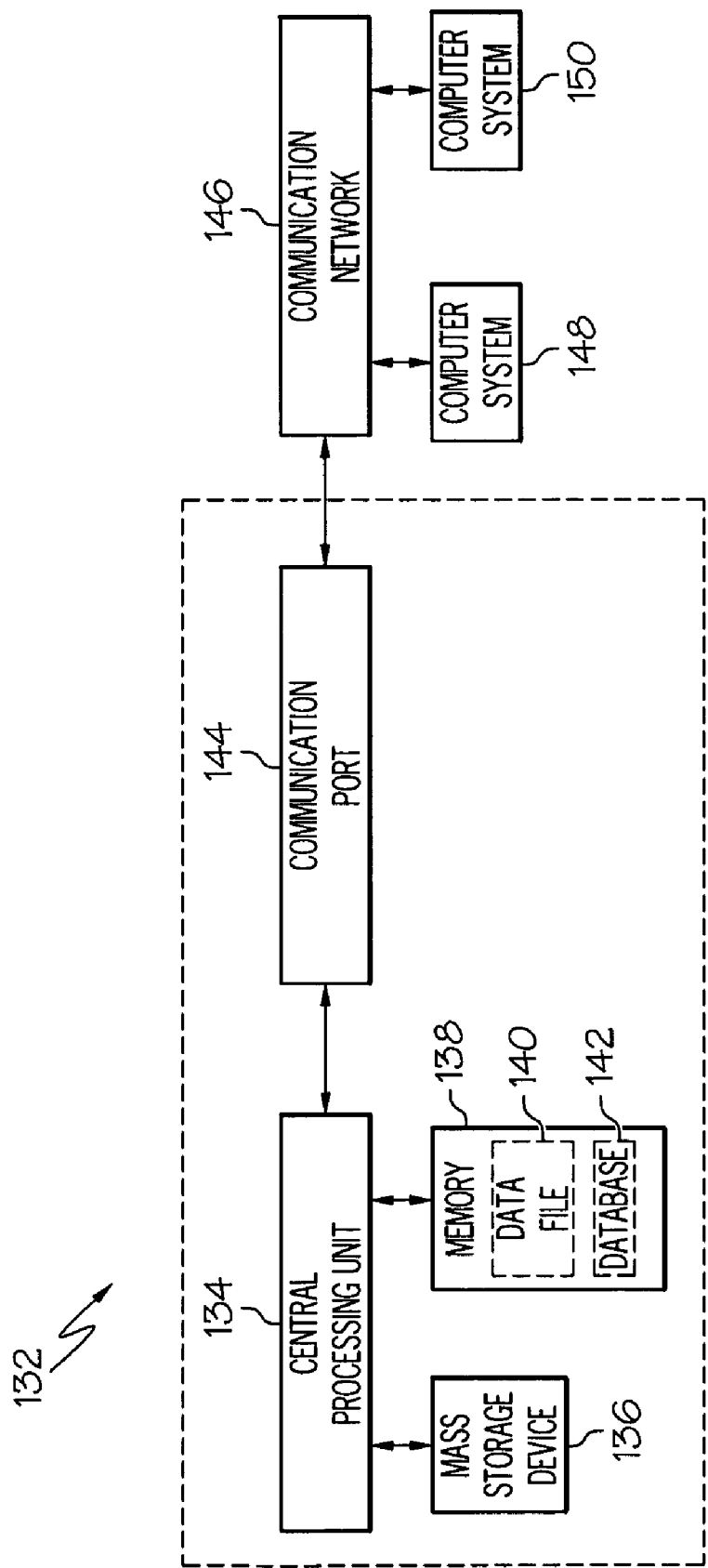
FIG. 5 illustrates an exemplary computing environment.

Turning to FIG. 5, an exemplary computing environment 10 is depicted capable of incorporating and using one or more aspects of the following claimed subject matter. As one skilled in the art will appreciate, however, the depicted exemplary embodiment is only one representation of a variety of configurations in which one or more aspects of the claimed subject matter may be implemented.

Environment 132 includes a central processing unit (CPU) 134 which may execute portions of computer instructions or scripts. Environment 132 may be embedded in a complex system under prognostic analysis, such as a vehicle or aircraft, or may be located in a remote location from the complex system. CPU 134 is connected to a mass storage device 136 such as a hard disk drive (HDD) or a similar component. CPU 134 is also connected to a memory 138 such as a non-volatile memory, for example, one or more EEPROMs (Electrically Erasable Programmable Read Only Memory), one or more flash PROMs (Programmable Read Only Memory), battery backup RAM, combinations thereof, and the like.

In one embodiment, the recursive mapping structures previously described may be implemented as data files 140 residing in memory 138, mass storage device 136, or elsewhere. The recursive structures may also be incorporated into a database schema 142 residing in memory 138, mass storage device 136, or another physical or logical location. The data files may be provided to hardware, software, or a combination thereof executing prognostic computer readable program code for interpretation. The skilled artisan will appreciate that the recursive structures may be implemented in a variety of methodologies associated with environment 132.

CPU 134 is coupled through a communication port 144 to a communication network 146 such as an Ethernet LAN (Local Area Network) or WAN (Wide Area Network). Communication network may include wireless components compatible with one or more wireless specifications, such as an IEEE 802.xx, WiMAX, or an equivalent standard. Finally, remote computer systems 148 and 150 are coupled to communication network 146. As one skilled in the art will appreciate, portions of computer programs, including the illustrated embodiments, prognostic processes and scripts heretofore described, may reside or execute on portions of environment 132, computer systems 148 and 150, or elsewhere.

Some of the functional units described in this specification have been labeled as "modules" in order to more particularly emphasize their implementation independence. For example, functionality labeled as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

While one or more embodiments of the present invention have been illustrated in detail, the skilled artisan will appreciate that modifications and adaptations to those embodiments may be made without departing from the scope of the present invention as set forth in the following claims.

What is claimed is:

1. A hierarchical recursive mapping structure for diagnostic models interpreted by at least one diagnostic reasoner executing on a processor, comprising:
   a parent diagnostic model, including:
      a first input module,
      a first output module,
      a first monitor module coupled to the first input and first output modules, and
      a first propagation module coupled between the first input and first output modules, and
   a child diagnostic model, including:
      a second input module,
      a second output module,
      a second monitor module coupled to the second input and second output modules, and
      a second propagation module coupled between the second input and second output modules, wherein the second monitor module is coupled to the first monitor module.

2. The recursive mapping structure of claim 1, wherein the child diagnostic model is representative of a line-replaceable unit (LRU).

3. The recursive mapping structure of claim 1, wherein the parent and child diagnostic models are incorporated into a database schema.

4. The recursive mapping structure of claim 1, wherein the parent diagnostic model includes further includes an additional child diagnostic model having an additional second input module, wherein the second output module is coupled to the additional second input module.

5. The recursive mapping structure of claim 4, wherein the child diagnostic model and the additional child diagnostic model are incorporated into a system reference model defined by the parent diagnostic model.

6. The recursive mapping structure of claim 5, wherein the system reference model is representative of a system.

7. The recursive mapping structure of claim 4, further including a grandparent diagnostic model having a third monitor module, wherein the first monitor module is coupled to the third monitor module.

8. The recursive mapping structure of claim 7, further including an additional parent diagnostic model having an additional first input module, wherein the first output module is coupled to the additional first input module.

9. The recursive mapping structure of claim 8, wherein the parent diagnostic model and the additional parent diagnostic model are incorporated into a platform reference model defined by the grandparent diagnostic model.

10. The recursive mapping structure of claim 9, wherein the platform reference model is representative of a platform.

11. A reference diagnostic model in a level of a hierarchy having a recursive mapping structure, the diagnostic model interpreted by at least one diagnostic reasoner executing on a processor comprising:
   an input module;
   an output module;
   a propagation module in communication with the input and output modules, the propagation module configured to describe at least one corrective action; and
   a monitor module in communication with the input and output modules, wherein the input and output modules are configured to communication with an additional reference model on a single level of a hierarchy.

12. The reference model of claim 11, wherein the single level is a line-replaceable unit (LRU) level, system level, or platform level.

13. The reference model of claim 11, wherein the monitor module is adapted for communication with an additional reference model on an additional level.

14. The reference model of claim 13, wherein the single level is a line-replaceable unit (LRU) level, and the additional level is a system level.

15. A computer program product for implementing a plurality of hierarchical diagnostic models having a recursive mapping structure, the plurality of diagnostic models interpreted by at least one diagnostic reasoner, the computer program product comprising a computer-readable storage medium having computer-readable program code portions stored therein, the computer-readable program code portions comprising:
   a first data file portion implementing a parent diagnostic model, including:
      a first input module,
      a first output module,
      a first monitor module logically coupled to the first input and first output modules, and
      a first propagation module logically coupled between the first input and first output modules, and
   a second data file portion implementing a child diagnostic model, including:
      a second input module,
      a second output module,
      a second monitor module logically coupled to the second input and second output modules, and
      a second propagation module logically coupled between the second input and second output modules, wherein the second monitor module is logically coupled to the first monitor module.

16. The computer program product of claim 15, wherein the child diagnostic model is representative of a line-replaceable unit (LRU).

17. The computer program product of claim 15, wherein the parent and child diagnostic models are incorporated into a database schema.

18. The computer program product of claim 15, wherein the second data file portion implements an additional child diagnostic model having an additional second input module, wherein the second output module is logically coupled to the additional second input module.

19. The computer program product of claim 18, wherein the child diagnostic model and the additional child diagnostic model are incorporated into a system reference model defined by the parent diagnostic model.

20. The computer program product of claim 19, wherein the system reference model is representative of a system.

\* \* \* \* \*